INVENTOR
T. N. LOWRY
BY H. L. Logan
ATTORNEY

Aug. 22, 1967 T. N. LOWRY 3,337,848

SERIAL ARRANGEMENT HAVING SELECTIVELY SWITCHED CROSSPOINTS

Filed Sept. 16, 1963 3 Sheets-Sheet 3

United States Patent Office 3,337,848
Patented Aug. 22, 1967

3,337,848
SERIAL MATRIX ARRANGEMENT HAVING SELECTIVELY SWITCHED CROSSPOINTS
Terrell N. Lowry, Columbus, Ohio, assignor to Bell Telephone Laboratories, Incorporated, a corporation of New York
Filed Sept. 16, 1963, Ser. No. 309,165
6 Claims. (Cl. 340—166)

ABSTRACT OF THE DISCLOSURE

A plurality of matrices are serially connected by connecting the leads of a first set of leads in each matrix to respective leads in a second set of leads in its succeeding matrix. Each source of a plurality of sources is operative to close a crosspoint in each matrix to complete a path through the matrices which path is unique to the source. Scanning equipment identifies the completed paths, thus identifying operated sources.

Figure 1:
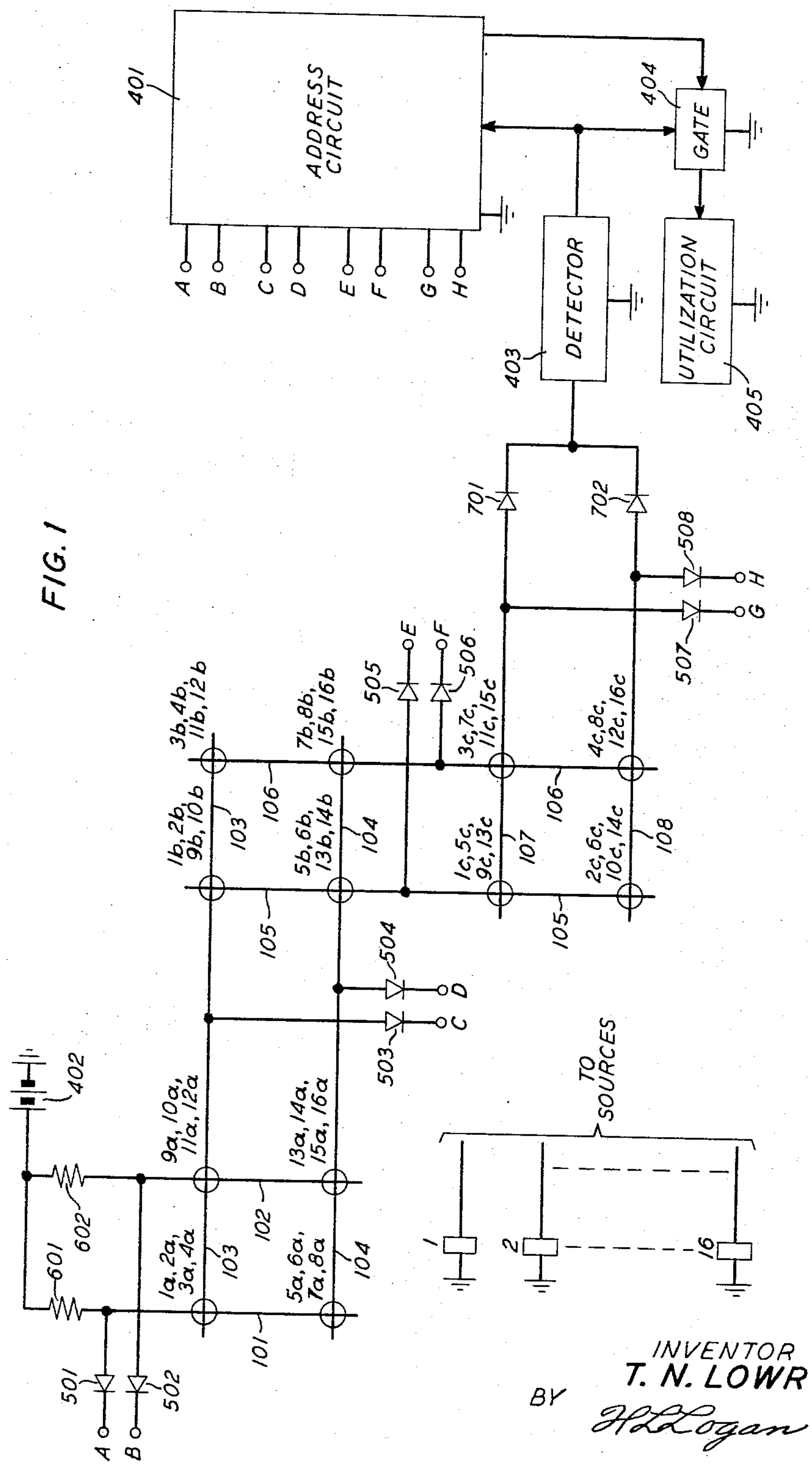

This invention relates to scanning arrangements and in particular to scanning arrangements that include matrix networks.

Scanning arrangements are used to identify sources producing some form of information. Such arrangements are used, for example, in telephone systems to identify service requests by customers.

One form of prior art scanning arrangements includes a matrix having networks, each of which comprises a dissociating element and a normally-open switch element, connected in series across respective crosspoints of the matrix. The dissociating elements may comprise resistors while the switch elements may comprise normally-open relay contacts. Information received from a source causes a switch element to close, thus completing a conductive path through the matrix which conductive path is unique to the source producing the information. Scanning of the matrix by an address circuit identifies the switch elements that are in closed conditions, thus identifying the sources that are producing information.

An object of the present invention is to reduce the overall costs of components in scanning arrangements.

Another object of the invention is to conserve power in a scanning arrangement.

These and other objects are achieved by using a multistage matrix network in place of the single matrix used in prior art scanning arrangements. In accordance with the invention each stage in the multistage network responds to all of the possible sources of information so that the sources are in effect divided into groups which are unique to that stage with any source in each group capable of producing a conductive path through the stage which path is unique to the group. Because of the uniqueness of the groupings of the sources and the uniqueness of the conductive paths through the stages, information from any given source results in producing a combination of conductive paths through the stages, which combination forms a unique conductive path through the multistage network. Conductive paths through the multistage network are identified, thus identifying the sources producing these paths, by a sequential address arrangement which sequentially tests for all possible conductive paths through the network.

As demonstrated in detail in the following description of several illustrated embodiments of the invention, use of the invention reduces the number of address circuit elements, dissociating elements and detector circuit elements while increasing the number of switch elements. Although the number of switch elements is increased, the cost of the elements eliminated exceeds that of the additional switch elements, thereby providing an overall reduction in component costs.

An advantage of embodiments of the invention is that they may be used so that the power consumption is substantially zero when the sources are not producing any information. In particular, embodiments of the invention may be used as large substantially non-power-consuming OR gates when information is not being received. Upon the occurrence of information, a signal is produced to indicate the occurrence of the information. Although this signal does not identify the source of the information, the signal is used to cause the address circuit to sequentially scan the multistage network which in turn causes the source to be identified. This feature of the invention is particularly advantageous when using embodiments of the invention in telephone system remote line concentrators because the amount of power that must be supplied to the concentrators is substantially reduced.

As discussed in detail subsequently, embodiments of the present invention may initially produce either false indications or fail to produce true indications as a result of combinations of information being received. These errors are not repeated, however, on a succeeding scan in applications where the sources stop producing information once they have been identified. The occurrence of these false indications has been studied on a statistical basis and found to be acceptable in many applications.

In one of its broader forms, embodiments of the invention include a plurality of matrices each having a plurality of crosspoints defined by a set of row leads and a set of column leads. Networks are connected between the leads at the crosspoints, respectively. Each of these networks comprises a parallel-connected plurality of normally-open switch elements connected in series with a dissociating element. The switch elements may comprise sets of relay contacts while the dissociating elements may comprise resistors or resistors and diodes connected in series. The matrices are serially connected so that leads in a set of leads in each succeeding matrix are connected to leads in a set of leads in its immediately preceding matrix, respectively. By serially connecting the matrices in this manner a finite number of distinct paths through the serially connected matrices is provided wherein each path includes only one crosspoint network of each of the matrices and is rendered conductive by the selective closures of the switches at these crosspoints. The number of information sources that may be identified by the arrangement is equal to the number of paths through the multistage network. In operation, the switch elements are controlled by incoming information to render conductive paths previously assigned to the sources of the incoming information. An address arrangement sequentially tests for all possible conductive paths. When a conductive path is tested, a detector produces an indication of the conductive state of the path thus identifying the source of information.

These and other objects and features of the invention will become apparent from the following description of several embodiments of the invention.

Figure 2:
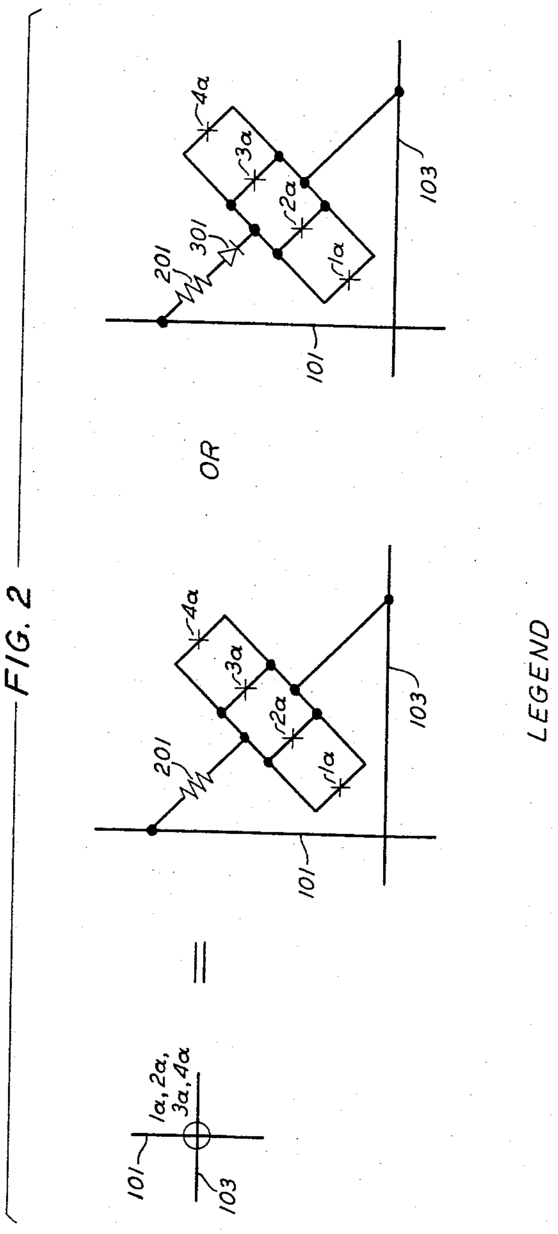
Figure 3:
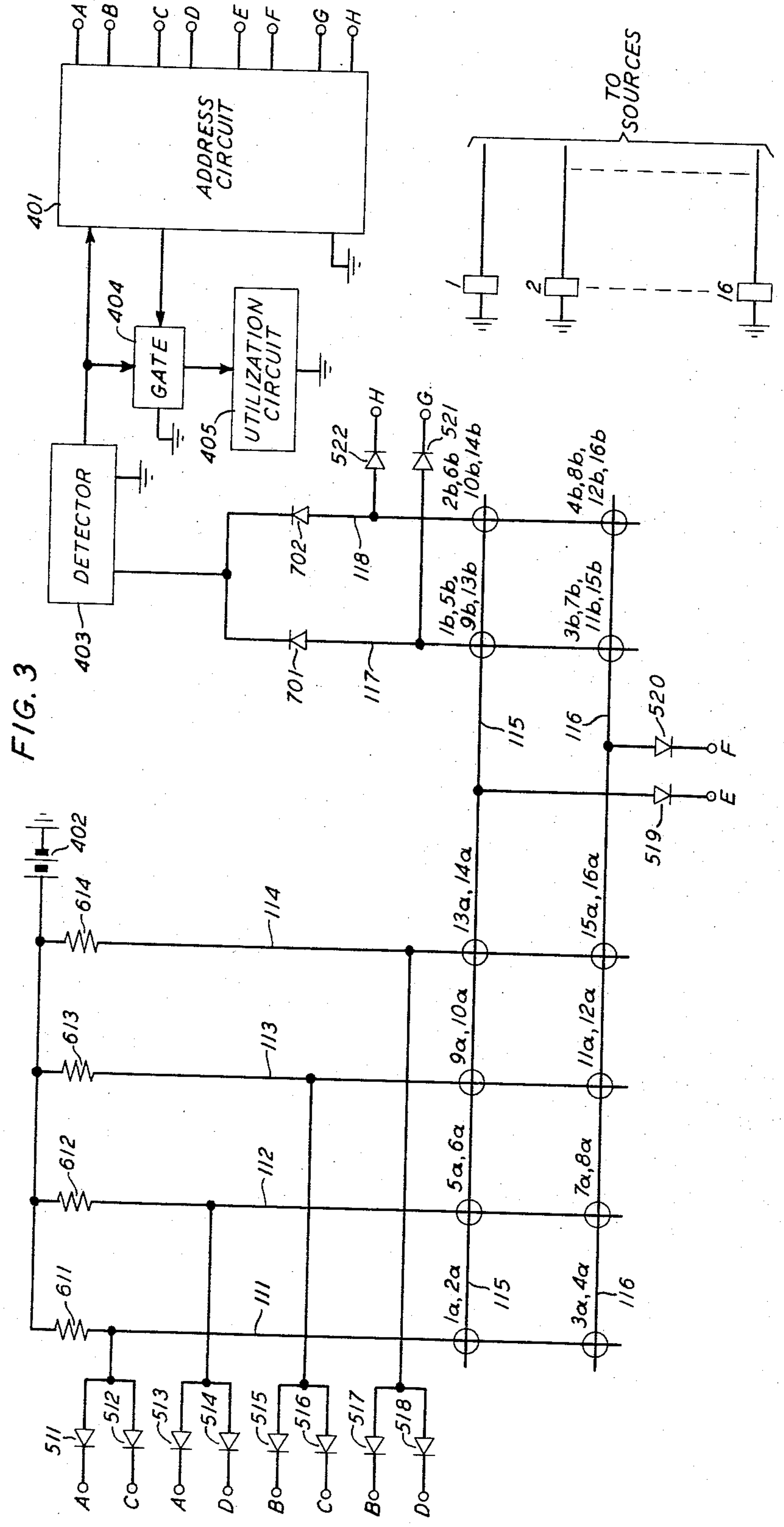

In the drawings:

FIG. 1 discloses in schematic and block diagram form one embodiment of the invention;

FIG. 2 is a legend explaining the use of one of the symbols used in the embodiment of FIG. 1; and FIG. 3 discloses in schematic and block diagram form a second embodiment of the invention.

FIG. 1 shows a scanning arrangement embodying the invention. This arrangement may be used for identifying sources which produce signals to enable one or more of a plurality of relays 1 through 16, respectively. The arrangement comprises three 2 x 2 matrices. The first of these matrices includes column leads 101 and 102 and row leads 103 and 104. The second matrix includes row leads which are also identified as 103 and 104 (inasmuch as they are connected to or contiguous with row leads 103 and 104 of the first matrix) and column leads 105 and 106. The third matrix includes column leads which are also identified as 105 and 106 (inasmuch as they are connected to or contiguous with column leads 105 and 106 of the second matrix) and row leads 107 and 108. A plurality of networks, shown for purposes of simplicity in symbolic form as circles, are connected between the row and column leads at each crosspoint, respectively. FIG. 2 shows in detail several networks that may be used at the crosspoint of leads 101 and 103 of FIG. 1. Each of these networks comprises a plurality of parallel-connected sets of normally-open relay contacts shown in detached form. The sets of relay contacts are identified by numbers 1 through 4 and the letter *a*. The numbers refer to relays 1 through 4, of which the contacts are a part, while the letters refer to particular sets of contacts on the relays. In one of the networks of FIG. 2, one terminal of the parallel-connected contacts is connected to lead 103, while the other terminal is connected to a dissociating resistor 201 which, in turn, is connected to lead 101. In the other network of FIG. 2, a diode 301 is connected in series with resistor 201. These two networks are discussed in greater detail subsequently. The remaining networks of FIG. 1 are substantially identical to the one used at the crosspoint of leads 101 and 103.

Referring again to FIG. 1, several things should be noted. Firstly, a set of contacts for each relay appears in each stage of the network. Secondly, the sets of contacts in each stage are connected in the crosspoint networks so that the sources affecting the relays are, in effect, divided into groups which are unique to that stage. Thirdly, the closure of any set of contacts in any crosspoint network produces a conductive path through the stage containing the network, which path is unique to the network. Fourthly, the uniqueness of the grouping of the sources by the crosspoint networks and the uniqueness of the possible conductive paths through the stage produced by the closure of contacts in the crosspoint networks produce conductive paths through the multistage matrix, which paths are unique to the sources. This may be further appreciated by first considering relay 1 to be energized. When relay 1 is energized, a conductive path from lead 101 to lead 103, to lead 105, and to lead 107 is provided. Now, consider relay 2 to be energized. When relay 2 is energized, a conductive path from lead 101 to lead 103, to lead 105, and to lead 108 is provided. It should be noted that the path for relay 1 includes lead 107, while the path for relay 2 includes lead 108. The paths, therefore, differ from one another. Similar differences appear when the remaining relays are energized. (False paths may be produced when two or more relays are simultaneously energized. This is discussed in detail subsequently.)

The multistage matrix of FIG. 1 is addressed by an arrangement comprising an address circuit 401, diodes 501 through 508, a battery 402, and resistors 601 and 602. Resistors 601 and 602 are connected between the positive terminal of battery 402 and leads 101 and 102, respectively. The negative terminal of battery 402 is connected to a point of ground potential. Diodes 501 through 508 are connected between leads 101 through 108, respectively, and address circuit 401 so that they are poled for easy current flow toward the address circuit. Address circuit 401 selectively returns the cathode terminals of diodes 501 through 508 to a point of ground potential. When, for example, the cathode terminal of diode 501 is returned to substantially ground potential, the diode is forward-biased and lead 101 is at substantially ground potential. When, however, the cathode terminal of diode 501 is not returned to substantially ground potential, lead 101 seeks a positive potential level determined by the remainder of the scanner. A particular path through the multistage matrix is tested for conductivity by grounding all of the address diodes not associated with the row and column leads in that path. The path associated with the source operating relay 1, for example, may be tested for continuity by permitting the point A, C, E, and G to remain ungrounded while grounding points B, D, F, and H. When this path is conductive, a positive potential appears on lead 107.

The conductivity of the various paths through the multistage matrix is detected by a detector arrangement comprising a pair of isolating diodes 701 and 702, and a detector 403. Diodes 701 and 702 are connected between detector 403 and leads 107 and 108, respectively, and are poled for easy current flow toward detector 403. Diodes 701 and 702 are selected so that they will not conduct when diodes 507 and 508, respectively, are connected to a point at substantially ground potential. Detector 403 produces an output when a positive potential appears on either lead 107 or lead 108.

The output of detector 403 is applied to address circuit 401. In the absence of any closed contacts (i.e., when the sources are not producing any information-bearing signals), address circuit 401 is in a deactivated state so that all address diodes 501 through 508 are ungrounded. Under this condition of operation, the multistage matrix is functioning as a large OR gate. Information signals from any one of the sources causes a signal to be applied immediately to detector 403. When such a signal occurs, detector 403 causes address circuit 401 to become activated and to sequentially address the multistage matrix by selectively grounding address diodes 501 through 508 as previously discussed.

The address produced by address circuit 401 is applied in serial form to a gate 404. The enabling input of gate 404 is connected to the output of detector 403. The address produced by address circuit 401 appears in serial form on the output of gate 404 when a conductive path through the multistage matrix is addressed. The output produced by gate 404 is applied to a utilization circuit 405.

As mentioned previously, embodiments of the present invention are particularly useful in telephone system remote line concentrators. In such an application, relays 1 through 16 of FIG. 1 are responsive to subscriber service requests while utilization circuit 405 comprises a central office. Furthermore, all of this circuitry shown in FIG. 1 with the exception of utilization circuit 405 (which would comprise a central office) is located at a remote location which is in close proximity to the subscribers. In operation, address information in serial form is fed to the central offiice via a single circuit, thus enabling the central office to connect the subscriber desiring service to one of a limited number of lines between the remote location and the central office. Because address circuit 401 is activated only when a service request is received, the power requirements for the remotely located equipment are kept to a minimum.

The saving in component cost effected by the present invention may be appreciated by comparing the embodiment of FIG. 1 with a single matrix scanning arrangement of the same capacity. For purposes of comparison, the single matrix will be assumed to be a 4 x 4 square matrix. (Square matrices are generally accepted as being more economical componentwise than rectangular matrices.) For such an arrangement, sixteen address diodes, sixteen dissociating elements, four isolating diodes and one set of contacts per relay are required. The embodiment of the invention shown in FIG. 1, on the other hand, requires eight address diodes, twelve dissociating elements, two isolating diodes, and three sets of contacts per relay. Although the embodiment of FIG. 1 requires a greater number of sets of contacts per relay, only one-half the number of address diodes and isolating diodes and two-thirds of the number of dissociating elements are required. As the cost of the additional sets of contacts is relatively small compared to the cost of the components that have been eliminated, a saving in component costs is effected.

False conductive paths may be produced when two or more relays in the embodiment of FIG. 1 are simultaneously energized. As an example, consider relays 2 and 5 to be energized and the matrix to be sequentially addressed by address circuit 401. When the path for relay 1 is addressed, an output will be produced because of the conduction between leads 101, 103, 105, and 107 produced by the closure of contacts *2a*, *2b*, and *5c*. In telephone use, false indications produced by false conductive paths are treated as abandoned calls. Assuming two and a half call requests per line per busy hour and a processing time of 100 milliseconds per call, the average probability of the occurrence of a single service request is .0045. Assuming a Poisson distribution, the occurrence of two simultaneous service requests has a probability of about one in one hundred thousand. This would occur less frequently than once per busy day and is therefore considered a tolerable situation.

Signal loss within the matrix arrangement produced by shunt paths as a result of several simultaneous service requests may occur. As an example, consider relays 1 and 6 to be energized and the path for relay 1 to be addressed. Furthermore, assume that the dissociating elements at the crosspoints are resistors only. Under this condition of operation, three shunt paths are present. One shunt path is from lead 101, through lead 104 and diode 504 to ground. A second shunt path is from lead 105 through lead 104 and diode 504 to ground. A third shunt path is from lead 105 through lead 108 and diode 508 to ground. This shunting may be sufficient to cause the signal at the anode of diode 701, when the path for relay 1 is addressed, to be at such a level that diode 701 fails to conduct and an output signal is not produced. However, as the scanner continues to scan the matrix, the fact that relay 6 is energized is recognized and action is taken so that relay 6 is no longer energized and the conductive path for relay 1 is not shunted to ground. Because relay 1 is still energized another scan is initiated and the conductive path for relay 1 is recognized on the second scanning of the matrix arrangement. In many applications this is considered to be a tolerable situation. As stated in the previous paragraph, this would probably not occur more often than once per busy day in an average telephone system.

When dissociating elements at the crosspoints also include a diode, as shown in FIG. 2, the previously discussed shunt path problem is somewhat reduced. As before, consider relays 1 and 6 to be energized and the conductive path for relay 1 to be addressed. The diode at the crosspoint between leads 105 and 104 is poled in such a direction that a shunting path from lead 105 through lead 104 and diode 504 to ground no longer exists. The use of the diodes, therefore, eliminates some of the shunting paths that would otherwise occur.

FIG. 3 discloses another embodiment of the invention for identifying sources which produce signals to enable one or more of a plurality of relays 1 through 16. This matrix arrangement comprises a 2 x 4 matrix and a 2 x 2 matrix. The first matrix includes column leads 111 through 114 and row leads 115 and 116. The second matrix includes row leads which are also identified as 115 and 116 (inasmuch as they are connected to or contiguous with row leads 115 and 116 of the first matrix) and column leads 117 and 118. A plurality of networks, shown for purposes of simplicity in symbolic form as circles, are connected between the row and column leads at each crosspoint, respectively. These networks may take the form of those shown in FIG. 2. As in FIG. 1, the numerals at the crosspoints identify the relays of which the contacts are a part, while the letters identify the particular set of contacts on the relays. The multistage matrix is addressed by an arrangement comprising a sequential address circuit 401, diodes 511 through 522, a battery 402, and resistors 611 through 614. Resistors 611 through 614 are connected between the positive terminal of battery 402 and leads 111 through 114, respectively. The negative terminal of battery 402 is connected to a point of ground potential, as in FIG. 1. Diodes 511 through 522 are connected between leads 111 through 118 and sequential address circuit 401 so that they are poled for easy current flow toward the sequential address circuit. It should be noted that each of the leads 111 through 114 has connected to it a pair of address diodes. It is necessary that pairs of diodes be connected to leads 111 through 114 because a one-out-of-four selection is required here, whereas only a one-out-of-two selection is required with respect to leads 115 and 116 and leads 117 and 118. This necessity is believed to be well appreciated by those skilled in the art. The remainder of the arrangement includes a pair of diodes 701 and 702, a detector 403, a gate 404, and a utilization circuit 405 which are connected together in a manner identical to that discussed with respect to the embodiment of FIG. 1.

The operation of the embodiment of FIG. 3 is substantially identical to that of the embodiment of FIG. 1. It should be noted, however, that the number of components required for the embodiment of FIG. 3 is greater than that required for the embodiment of FIG. 1. In particular, twelve instead of eight address diodes are required and four instead of two address circuitry resistors are required. It will be noted, however, that only two sets of contacts per relay are required in the embodiment of FIG. 3 instead of three sets of contacts per relay, as required in the embodiment of FIG. 1. The shunt path problem discussed with respect to the embodiment of FIG. 1 is not as severe in the embodiment of FIG. 3 as the severity of the shunt path problem increases as the number of matrices is increased.

Several facts which have been either mentioned or discussed above should be taken into consideration when practicing the invention. Firstly, although the invention may be practiced by using either square or rectangular matrices, it is in general more economical to use square matrices when possible. This is because square matrices in general require fewer components than rectangular matrices of the same capacity. In particular, notwithstanding the fact that a square matrix and a rectangular matrix of the same capacity require the same number of address signals, the square matrix requires fewer address diodes. Secondly, the greater the number of matrices used in practicing the invention, the fewer the number of components required. This fact is demonstrated below. Thirdly, as the number of matrices is increased (whether or not diodes are used as a part of the dissociating elements), the greater the possibility of false signals and loss of true signals during the first scan. As pointed out previously, such false signals and loss of true signals will be found to be tolerable in many applications. The number that can be tolerated will of course depend upon the particular application.

In view of the previous paragraph, the following equations have been derived to facilitate the design of multistage arrangements using square matrices:

$p=v^a$; $c=v^{(a-2)}$; $s=a-1$ where:

$p$=unique paths through multistage arrangements;
$v$=number of vertical or horizontal leads;
$a$=number of address locations (there is an address location at the input of the first matrix, the output of the last matrix and at each junction between the matrices);
$s$=sets of contacts for each relay and also the number of matrices; and
$c$=sets of contacts at each crosspoint.

As an example of the manner in which the above equations may be used, assume that it is desired to produce a multistage matrix arrangement in accordance with the invention in which the arrangement has sixty-four unique paths. Two possible solutions to the first expression comprise $v=2$, $a=6$, and $v=4$, $a=3$. The first solution results in an arrangement comprising five 2 x 2 matrices, twelve address diodes, twenty dissociating elements, two detector diodes, and five contacts per relay. The second solution results in an arrangement comprising two 4 x 4 matrices, twenty-four address diodes, thirty-two dissociating elements, four detector diodes, and two contacts per relay. It will be noted that the first solution results in an arrangement which requires fewer components. It should be remembered, however, that as the number of matrices increases, whether or not diodes are used as a part of the dissociating elements, the greater the possibility of false signals and loss of true signals. As pointed out previously, this should enter into the design of the particular arrangement to be used.

Although several embodiments of the invention have been described in detail it is to be understood that various other embodiments may be devised by those skilled in the art without departing from the spirit and scope of the invention.

What is claimed is:

1. In combination a plurality of matrices each having a plurality of crosspoints defined by first and second sets of leads where one of said sets comprises row leads and the other set comprises column leads with impedance means connected between the leads at said crosspoints, respectively, each of which impedance means at any particular time has one of two impedance values where one of said values is relatively large with respect to the other of said values, means serially connecting said matrices comprising means connecting the leads in the first set of leads of each matrix to respective leads in the second set of leads in its succeeding matrix to produce a finite number of distinct paths through said serially connected matrices wherein each path includes only one impedance means in each of said matrices, means for controlling said impedance means to render conductive any one of said paths, detecting means connected between a point of reference potential and the leads of the matrix at one extremity of said serially connected matrices which leads are not connected to any other matrix by said serially connecting means, and means connected between said leads and said point of reference potential to selectively apply voltages of predetermined levels to said leads.

2. In combination a plurality of matrices each having a plurality of crosspoints defined by first and second sets of leads where one of said sets comprises row leads and the other set comprises column leads with networks connected between the leads at said crosspoints, respectively, wherein each of said networks comprises a parallel connected plurality of normally open switch elements connected in series with a dissociating element, means serially connected said matrices comprising means connecting the leads in the first set of leads of each matrix to respective leads in the second set of leads in its succeeding matrix to produce a finite number of distinct paths through said serially connected matrices wherein each path includes only one crosspoint network in each of said matrices, means for controlling said switch elements to render conductive any one of said paths, detecting means connected between a point of reference potential and the leads of the matrix at one extremity of said serially connected matrices which leads are not connected to any other matrix by said serially connecting means, and means connected between said leads and said point of reference potential to selectively apply voltages of predetermined levels to said leads.

3. A combination in accordance with claim 2 in which each of said dissociating elements comprises a resistor.

4. A combination in accordance with claim 2 in which each of said dissociating elements comprises a resistor and a diode connected in series.

5. In combination a plurality of matrices each having a plurality of crosspoints defined by a set of row leads and a set of column leads with networks connected between the leads at said crosspoints, respectively, each of said networks comprising a group of parallel connected normally open switch elements and a resistor connected in series, means serially connecting said matrices so that leads in a set of leads in each succeeding matrix are connected to leads in a set of leads in its immediately preceding matrix, respectively, a plurality of means each of which when enabled closes a switch element in each of said matrices to produce a conductive path through said serially connected matrices which path is unique to the means producing the closure of said switch elements, detecting means connected between a point of reference potential and the leads of the matrix at one extremity of said serially connected matrices which leads are not connected to any other matrix by said serially connecting means, a source of potential connected to the leads of the matrix at the other extremity of said serially connected matrices which leads are not connected to any other matrix by said serially connecting means, and means to selectively apply a potential substantially equal to that of said point of reference potential to said row and column leads of said matrices.

6. In combination a plurality of relays each of which has a plurality of sets of normally open contacts, a plurality of matrices each having a plurality of crosspoints defined by a set of row leads and a set of column leads with networks connected between the leads at said crosspoints, respectively, each of said networks comprising means connecting in parallel a group of said sets of contacts so that each of said matrices includes a distinct set of contacts of each of said relays with no two of said groups formed of sets of contacts the same relays and a resistor connected in series with said means connecting said sets of contacts in parallel, means serially connecting said matrices so that leads in a set of leads in each succeeding matrix are connected to leads in a set of leads in the immediately preceding matrix, respectively, detecting means connected between a point of reference potential and the leads of one of the matrices at one extremity of said serially connected matrices which leads are not connected to any other matrix by said serially connecting means, a source of potential connected to the leads of the matrix at the other extremity of said serially connected matrices which leads are not connected to any other matrix by said serially connecting means, and means to selectively apply a potential substantially equal to that of said point of reference potential to said row and column leads of said matrices.

References Cited

UNITED STATES PATENTS

| | | | |
|---|---|---|---|
| 2,802,903 | 8/1957 | Rommel | 340—166 X |
| 3,038,968 | 6/1962 | Jabczynski | 179—18.7 |
| 3,141,067 | 7/1964 | Spandorfer | 340—166 X |
| 3,201,520 | 8/1965 | Bereznak | 340—166 X |

NEIL C. READ, *Primary Examiner.*

H. I. PITTS, *Assistant Examiner.*